United States Patent
Campbell et al.

(10) Patent No.: US 6,338,803 B1
(45) Date of Patent: Jan. 15, 2002

(54) PROCESS FOR TREATING WASTE WATER CONTAINING HYDROFLUORIC ACID AND MIXED ACID ETCHANT WASTE

(75) Inventors: Deon Eugene Campbell, Vancouver, WA (US); Dustin Kimbel James, Sugar Land, TX (US); Jereme Francis, Vancouver, WA (US); Thomas Stocker, San Diego, CA (US)

(73) Assignee: Koch Microelectronic Service Co., Inc., Houston, TX (US)

( * ) Notice: Subject to any disclaimer, the term of this patent is extended or adjusted under 35 U.S.C. 154(b) by 0 days.

(21) Appl. No.: 09/385,321

(22) Filed: Aug. 30, 1999

(51) Int. Cl.[7] ............................................. B01D 61/00
(52) U.S. Cl. ...................... 210/652; 210/639; 210/651; 210/739; 210/257.2; 134/10
(58) Field of Search ................................ 210/651, 652, 210/739, 767, 195.2, 257.2, 639; 134/10, 11

(56) References Cited

U.S. PATENT DOCUMENTS

| | | | |
|---|---|---|---|
| 1,324,118 A | 12/1919 | Hottinger et al. |
| 3,075,645 A | 1/1963 | Riddick |
| 3,097,163 A | 7/1963 | Riddick |
| 3,101,317 A | 8/1963 | Starry |
| 3,521,752 A | 7/1970 | Lindman |
| 3,544,476 A | 12/1970 | Aiba et al. |
| 4,016,075 A | 4/1977 | Wilkins |
| 4,165,264 A | 8/1979 | Satchell, Jr. |
| 4,188,291 A | 2/1980 | Anderson |
| 4,207,183 A | 6/1980 | Herrigel |
| 4,246,102 A | 1/1981 | Hjelmener et al. |
| 4,260,493 A | 4/1981 | Kretas et al. |
| 4,276,180 A | 6/1981 | Matson |
| 4,420,401 A | 12/1983 | Kretas et al. |
| 4,450,057 A | 5/1984 | Kelly |
| 4,504,356 A | 3/1985 | Mulder et al. |
| 4,731,187 A | 3/1988 | Moriya et al. |
| 4,765,913 A | 8/1988 | Featherstone |
| 4,778,532 A | * 10/1988 | Mcconnell et al. |
| 4,780,211 A | 10/1988 | Lien |
| 4,915,844 A | * 4/1990 | Imamura et al. |
| 4,917,123 A | * 4/1990 | McConnell et al. |
| 4,938,876 A | 7/1990 | Ohsol |
| 4,957,634 A | 9/1990 | Bowers, Jr. |
| 4,990,260 A | * 2/1991 | Pisani |
| 5,078,900 A | 1/1992 | Wegner |
| 5,108,620 A | * 4/1992 | Wester et al. |
| 5,164,095 A | 11/1992 | Sparapany et al. |
| 5,171,453 A | 12/1992 | Communal |

(List continued on next page.)

FOREIGN PATENT DOCUMENTS

WO   WO 97/47380   12/1997

OTHER PUBLICATIONS

Aspila, K., et al., "Studies on the Stability of Dithiocarbamic Acids," Chemistry Department, Carleton University, Ontairo, Canada, *Talanta*, 1969, vol. 16, pp. 1099 to 1102.

(List continued on next page.)

*Primary Examiner*—Ana Fortuna
(74) *Attorney, Agent, or Firm*—Shook, Hardy & Bacon LLP

(57) ABSTRACT

A process for treating waste water containing hydrofluoric acid, mixed acid etchant waste, dissolved silica, and solid particles is provided. This process involves adjusting the pH of the waste water to about 7 or above, filtering the waste water to remove solid particles, adding an anti-scalant to the waste water, and feeding the waste water through a reverse osmosis membrane. The reverse osmosis membrane separates the waste water into a permeate stream, which is the product, and a reject stream. Another aspect of the present invention is a system for performing this process.

22 Claims, 1 Drawing Sheet

U.S. PATENT DOCUMENTS

| | | | |
|---|---|---|---|
| 5,182,023 A | | 1/1993 | O'Connor et al. |
| 5,205,939 A | | 4/1993 | Syrinek |
| 5,246,686 A | | 9/1993 | Cuer et al. |
| 5,362,461 A | * | 11/1994 | Ohmi et al. |
| 5,382,423 A | * | 1/1995 | Ohmi et al. |
| 5,453,206 A | * | 9/1995 | Browne |
| 5,510,040 A | | 4/1996 | Miller et al. |
| 5,512,181 A | | 4/1996 | Matchett |
| 5,556,545 A | | 9/1996 | Volchek et al. |
| 5,575,915 A | | 11/1996 | Nakamura et al. |
| 5,605,633 A | | 2/1997 | Nakamura et al. |
| 5,609,765 A | | 3/1997 | Bowman |
| 5,620,629 A | | 4/1997 | Salmen et al. |
| 5,871,648 A | | 2/1999 | Allen et al. |
| 5,876,685 A | * | 3/1999 | Krulik et al. |
| 5,965,027 A | * | 10/1999 | Allen et al. |
| 6,050,283 A | * | 4/2000 | Hoffman et al. |
| 6,106,722 A | * | 8/2000 | Chew et al. |
| 6,158,445 A | * | 12/2000 | Olesen et al. |

OTHER PUBLICATIONS

Harris, G. B., et al., "The Stability of Arsenic–Bearing Residues," Paper presented at TMS–AIME Symposium, "Arsenic Metallurgy–Fundamentals and Application," Phoenix, Arizona Jan. 25–29, 1988.

Hulanicki, A., et al., "Complexation Reactions of Dithiocarbamates," Department of Inorganic Chemistry, University of Warsaw, Poland, *Talanta Review*, 1967, vol. 14, pp. 1371 to 1392.

Janssen, M. J., "The Stability Constants of Metal Complexes of Some N–Dialkyldithiocarbamic Acids," Institute for Organic Chemistry T.N.O, Utrecht, the Netherlands), 75 (1956) *RECUEIL* 1411.

Janssen, M. J., "The Stability Constants of Metal Complexes of Some N–Dialkyldithiocarbamic Acids," Institute for Organic Chemistry T.N.O, Utrecht, the Netherlands), 76 (1957) *RECUEIL* 827.

Joris, Serge J., et al. "On the Monobasic or Dibasic Character of Dithiocarbamic Acids," Department of Chemistry, Carleton University, Ottawa I, Ontario, *Analytical Chemistry*, vol. 41, No. 11, Sep. 1969.

Miertuš, Stanislav, et al., "Theoretical Study of the Electron Structure and Properties of Dithiocabamates and Their Complexes With Transition Metals," Department of Analytical Chemistry, Slovak Technical University, 812.37 and $^b$ Cancer Research Institute, Slovak Academy of Science, 812.32 Bratislava, *Collection Czechoslovak Chem. Commun.* [vol. 49] 1984.

Scharfe, R. R., et al., "Stability of Metal Dithiocarbamate Complexes," Department of Chemistry, Carleton University, Ottawa, Ontario K1S 5B6, Canada.

Tetsumi, T., et al., "Direct Reaction of Metal Powders With Several Sodium Dithiocarbamates," Department of Pharmaceutical Sciences, Setsunan University, Nagao Toge–cho, Hirakata–shi, Osaka 5730–01, Japan.

Wasay, S.A., et al., "Removal of Trace Heavy Metals by Metal Chelates," *Intern J. Environmental Studies*, 1990, vol. 36, pp. 191–197.

Cattaneo, Jeffrey F., "Removal Of Copper Ions From Rinse Water Using $TiO_2$ Photocatalysis", *SSA Journal*, vol. 13—Spring 1999, pp. 55–59.

Duyvesteyn, W.P.C. et al., "Ammonia Leaching Process for Escondida Copper Concentrates," pp. C125–C140, reprinted by *Extractive metallurgy of Copper, Nickel and Cobalt*, vol. I: *Fundamental Aspects*, edited by Reddy R.G. and Weizenbach R.N. (Warrendale, PA: The Minerals, Metals and Materials Society, Inc. (TMS), 1993).

Egermeier, John, et al., "Treatment of Wastewater Generated by Copper Metalization and CMP," Proceedings of Watertech '99 Executive Form, Oct. 5–6, 1999, Portland, Oregon.

Maeda, Bruce T. et al., "Treating Wastes Generated by Copper Electroplating Tools", *MICRO*, Sep. 1999, pp. 39–49.

Mendicino, Laura, et al., "The Environment, Health and Safety Side of Copper Metalization," *Semiconductor International*, Jun. 1998, pp.105–106, 108, and 110.

Treasure, Tony, "The EMEW Cell" Engineered and Ready to Take on New Markets, Randol Copper Hydrometallurgy Forum, Vancouver, 1998, pp. 1–25.

Won, C.W. et al., "Recovery of Copper from –Etchant Solution by Electrowinning and Cementation," *Metallurgical Transactions*, vol. 24B, Feb. 1993, pp. 192–197.

* cited by examiner

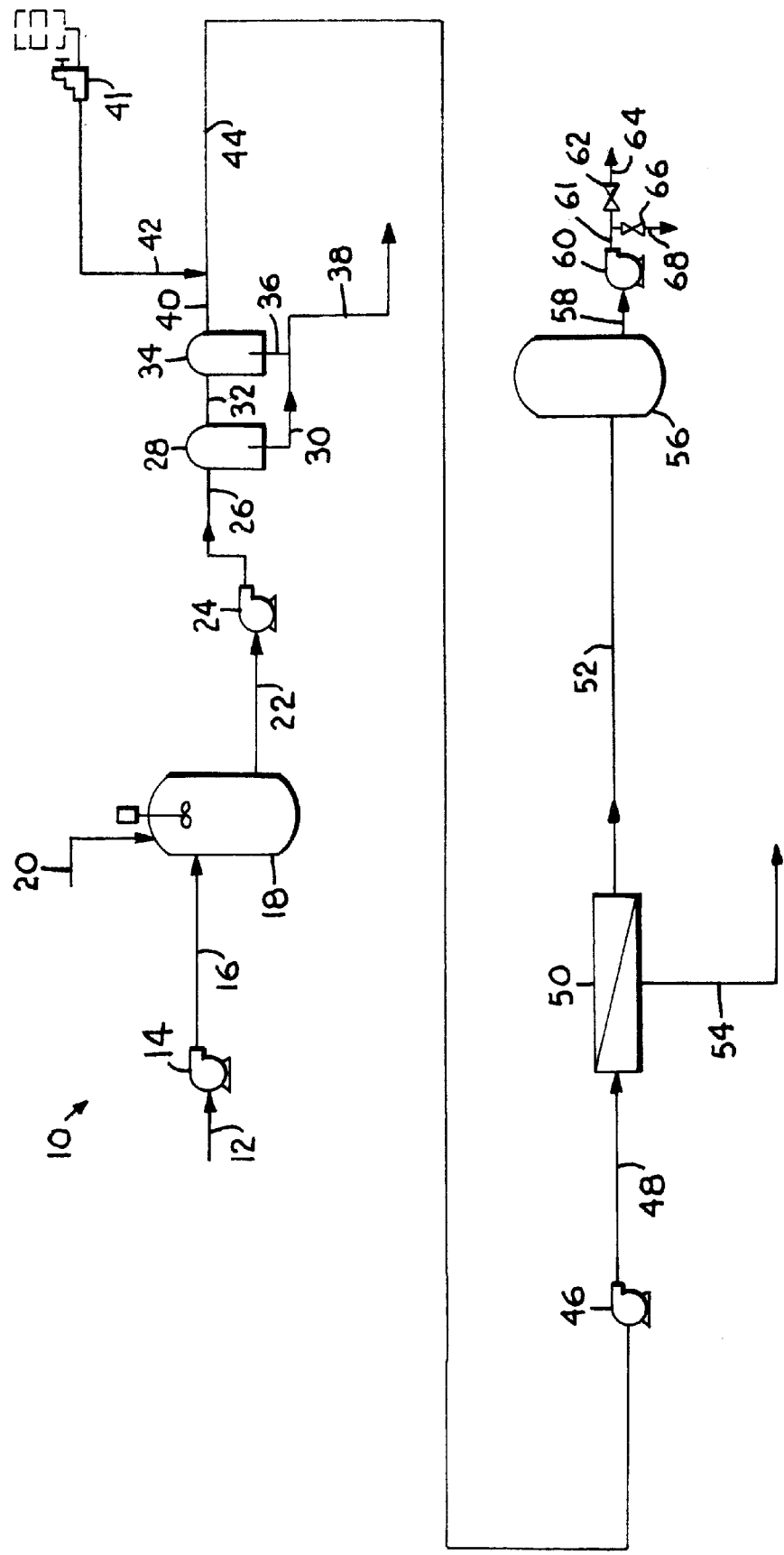

PROCESS FOR TREATING WASTE WATER CONTAINING HYDROFLUORIC ACID AND MIXED ACID ETCHANT WASTE

STATEMENT REGARDING FEDERALLY-SPONSORED RESEARCH OR DEVELOPMENT

Not applicable.

CROSS REFERENCE TO RELATED APPLICATIONS

Not applicable.

BACKGROUND OF THE INVENTION

The process of the present invention relates to treating waste water by reverse osmosis. More specifically, this process involves treating waste water that contains hydrofluoric acid (HF) and mixed acid etchant (MAE) waste.

Currently, waste water containing HF and MAE waste is generated by silicon wafer manufacturers. MAE waste contains mixtures of acids including hydrofluoric acid and nitric acid ($NHO_3$). It also may contain acetic acid ($CH_3CO_2H$). Still further, the MAE waste contains dissolved silica ($SiO_2$). Dissolved silica may also be found in the HF stream that is part of the waste water. Conventionally, this waste water is treated with calcium hydroxide ($Ca(OH)_2$, which is lime) or calcium chloride ($CaCl_2$) to precipitate fluoride. The disadvantage with this process is that it is difficult to produce clean and reusable water, and instead, much of the waste water must be disposed. Another disadvantage with this process is that when $CaCl_2$ is used, it is especially difficult to reclaim the water due to the presence of a high concentration of chloride. Another disadvantage is that lime or calcium chloride treatment does not remove nitrates. Another method for treating this waste is by biological denitrification so as to remove nitrates from the waste water. However, such a process requires expensive capital costs. Still further, both of these conventional processes are not able to concentrate the waste being removed, and therefore, these processes require large vessels for processing the waste water.

SUMMARY OF THE INVENTION

It is an object of the present invention to provide a process for treating waste water containing hydrofluoric acid, mixed acid etchant waste, and dissolved silica that is able to produce clean, reusable water.

Another object of the present invention is to provide a waste water treatment system that results in lower capital costs compared to conventional systems because the waste is concentrated thus requiring smaller treatment vessels.

According to the present invention, the foregoing and other objects are achieved by a process for treating waste water containing hydrofluoric acid, mixed acid etchant waste, dissolved silica, and solid particles and a system for performing this process. This process involves adjusting the pH of the waste water to about 7 or above, filtering the waste water to remove solid particles, adding an anti-scalant to the waste water, and feeding the waste water through a reverse osmosis membrane. The reverse osmosis membrane separates the waste water into a permeate stream, which product, and a reject stream.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWING

In the accompanying drawing, which forms a part of the specification and is to be read in conjunction therewith:

The drawing is a schematic representation of a waste water treatment system for performing the process of the preferred embodiment of the present invention.

DETAILED DESCRIPTION OF THE PREFERRED EMBODIMENT

Referring to the drawing, a system 10 for treating waste water containing hydrofluoric acid and mixed acid etchant waste is shown. A line 12 carries waste water to a pump 14, which pumps the waste water through a line 16 and into a tank 18. A line 20 feeds an acid or base into tank 18 to adjust the pH of the waste water. The waste water exits tank 18 through a line 22 and is pumped by pump 24 into a line 26, through which it is fed into a filter 28. Solids exit filter 28 through a line 30, and liquid exits through a line 32 which feeds the liquid to a second filter 34. Solids exit second filter 34 through a line 36 and are combined with the solids in line 30 into a line 38. The solids exit in line 38 to a housing drain or a gravity drain (not shown). Liquid exits filter 34 in a line 40. An anti-scalant is pumped by a pump 41 into a line 42 and is then combined with the filtered liquid from line 40 in a line 44. The filtered liquidating-scalant in line 44 is fed through a pump 46 to a line 48 and into a reverse osmosis (RO) unit 50. A permeate stream exits reverse osmosis unit 50 through a line 52, and a reject stream exits the reverse osmosis unit through a line 54. The permeate stream, which is the product of system 10, is carried by line 52 to a tank 56 for storage. The product may exit tank 56 through a line 58, where a pump 60 pumps it through a line 61 and then, depending upon the purity of the product, through a valve 62 and through a line 64, or, alternatively, through a valve 66 and a line 68. A conductivity meter (not shown) may be used to test the purity of the product. Water that can be used as reclaim water exits through valve 62 and line 64, and the water that must be further treated exits through valve 66 and line 68.

The system described above is used to perform a waste water treatment process, which is another aspect of the present invention. This process involves treating mixed acid etchant (MAE) waste, which contains hydrofluoric acid, nitric acid, and dissolved silica. It also may contain acetic acid. The silica may be in the form of $SiO_2$, $Si(OH)_4$, silicon tetrafluoride ($SiF_4$), $SiF(OH)_3$, $SiF_2(OH)_2$, or $SiF_3(OH)$, or combinations thereof. Preferably, the waste water treated by the process of the present invention contains MAE waste and other hydrofluoric acid (HF) waste. The HF waste may also contain dissolved silica. Usually, the waste water has an acidic pH when it enters the system in line 12. More specifically, its pH is generally below 6. More often it is below 4, and most often it is below 3. When the waste water does not have a pH below 6, it is often because another stream has been mixed into the waste. An example of such a stream is a buffered oxide etchant (BOE), which is comprised of mixtures of hydrofluoric acid (HF), ammonia ($NH_3$) or ammonium hydroxide ($NH_4OH$), and ammonium fluoride ($NH_4F$).

For the best results, the waste water stream to be treated, which is carried in line 12, has a fluoride content of less than 2000 parts per million (ppm), a calcium content of less that 250 ppm, a magnesium content of less than 10 ppm, a silica content of less than 200 ppm, an iron content of less than 10 ppm, an aluminum content of less than 10 ppm, a nitrate and nitrite content of less than 7500 ppm, and an acetate content of less than 5000 ppm. Preferably, this waste water stream has a fluoride content of less than 1750 ppm, a calcium content of less than 200 ppm, a magnesium content of less than 5 ppm, a silica content of less than 150 ppm, an iron content of less than 5 ppm, an aluminum content of less than 5 ppm, a nitrate and nitrite content of less than 5000 ppm, and an acetate content of less than 3000 ppm. Most preferably, this waste water stream has a fluoride content less than 1500 ppm, a calcium content less than 150 ppm, a magnesium content of less than 5 ppm, a silica content less than 130 ppm, an iron content of less than 5 ppm, an aluminum content of less than 5 ppm, a nitrate and nitrite content of less than 2500 ppm, and an acetate content of less than 2000 ppm. The temperature of the waste water entering the system is preferably between about 15 and 40° C. More preferably, it is between about 20 and 30° C. Most preferably, it is between about 23 and 27° C.

The pH of the waste water is adjusted to approximately 7 or above in tank 18. Preferably, the pH is adjusted to between about 8 and 10. Most preferably, the pH is adjusted to between about 8.5 and 9.5 when the silica content of the waste water is below 150 ppm, and the pH is adjusted to between about 9.5 and 10 when the silica content of the waste water is 150 ppm or above. A base, such as but not limited to, sodium hydroxide (NaOH), potassium hydroxide (KOH), or ammonium hydroxide ($NH_4OH$), may be used to adjust the pH by feeding the base through line 20 into tank 18. Preferably, calcium containing bases such as calcium hydroxide or calcium carbonate are avoided so as to reduce the possibility of scaling in the reverse osmosis unit. If the pH of the waste water is above 8, no adjustment may be necessary, or an acid, such as but not limited to sulfuric acid or hydrochloric acid, may be used to adjust the pH to the preferred pH.

The waste water is passed through a filtration unit to remove solid particles. Preferably, this filtration step is performed after the pH of the waste water is adjusted, as shown in the drawing. This filtration step is especially important when the waste water being treated contains high levels of silica. This filtration unit may include one or more filters selected from cartridge filters, line filters, bag filters, sand filters, multi-media filters, ultrafilters, or microfilters. The filtration unit is shown as two filters, 28 and 34, in the drawing, but the process of the present invention can be carried out with one filter. Preferably, the filtration unit removes solids in the waste water so that the waste water exiting the filtration unit has a turbidity below about 3 nephelometric turbidity units (NTU). More preferably, its turbidity is below 1 NTU, and most preferably, its turbidity is below 0.2 NTU. By reducing the solids in the waste water, the life of the reverse osmosis membrane is prolonged because plugging caused by solids is prevented. Preferably, the filter contains activated carbon or granular activated carbon, which acts to remove organic compounds, such as surfactants, soaps, and some organic solvents, that may be in the water. Organic compounds, if not removed, may coat the surface of the reverse osmosis membrane decreasing its life time. The carbon treatment can also protect the reverse osmosis membrane from biologically active components such as fungus or mold, which also can decrease the effectiveness of the reverse osmosis membrane.

Following the pH adjustment and the filtration, the waste water is processed through reverse osmosis unit 50, which includes at least one membrane. The water that passes through the membrane is the reverse osmosis permeate. It exits unit 50 in line 52. The water that is rejected by the membrane and which contains most of the dissolved solids is the reverse osmosis reject. It exits unit 50 in line 54. The osmotic pressure of the feed water increases as it is concentrated through each pass of the reverse osmosis unit. To help the process run more efficiently, the membrane should be cleaned periodically, such as approximately every 6 months. Because the process of the present invention involves concentrating the waste contained in the waste water, it requires smaller vessels than conventional treatment operations.

The reverse osmosis membrane may be comprised of cellulose acetate, a thin film composite, or other materials known in the art. Preferably, if thin film composite membranes are used, they are used in the form of a spiral wound membrane. It is preferable that the maximum pressure at which the membrane should operate is 600 psi. More preferably, the membrane is operated at a pressure of between about 150 and 350 psi.

In one embodiment, reverse osmosis unit 50 is a two pass reverse osmosis system. In a two pass reverse osmosis unit, the waste water is fed through a first pass where it is separated into a first permeate and a first reject. The first permeate from the first pass is pumped as a feed stream to a second reverse osmosis pass. The first reject stream contains the majority of the dissolved salt, which exits the system of the present invention through line 54, and may be pumped to a fluoride waste treatment system. The second pass separates the first permeate into a second permeate and a second reject. The second reject is recycled and combined with the incoming waste water before it enters the first pass of unit 50, while the second permeate, the product, is fed to product storage tank 56 via line 52.

Each reverse osmosis pass is comprised of banks or arrays of membranes. If this is a two pass system, it is common for the first pass to have an array comprising two banks of concentrate staged pressure vessels with each pressure vessel containing the equivalent of four eight inch diameter by sixty inch long membrane elements in series with an operating recovery of about 75 to 80%. It is common for the second pass to have an array comprising two banks of concentrate staged pressure vessels with each pressure vessel containing the equivalent of four eight inch diameter by sixty inch long membrane elements in series with an operating recovery of about 90%. Permeate from the first pass is fed to the second pass.

The banks of the reverse osmosis system may contain the same type of membranes. Preferably, however, the banks of the system of the preferred embodiment include two different types of membranes. The most preferred configuration for reverse osmosis unit 50 is as described above with the first bank of the first pass containing extra-high reject (XR) membranes, the second bank of the first pass containing high reject (HR) membranes, and both banks of the second pass containing either all XR or all HR membranes. However, reverse osmosis unit 50 may be comprised of all XR membrane, all HR membranes, or any combination of these membranes. The XR membranes have a higher rejection rate, but produce less permeate flow than the HR membranes at the same pressure. The combination of XR and HR membranes described as the preferred embodiment is able to obtain a good balance between system performance and operating costs. The XR and HR membranes described above may be obtained from Koch Membrane Systems, Inc. of San Diego, Calif.

Preferably, the product, which is the permeate from the second pass and is shown exiting reverse osmosis unit 50 in line 52, has a maximum fluoride content of 15 ppm. Most preferably, this product has maximum fluoride content of 4 ppm, a maximum calcium content of 25 ppm, a maximum magnesium content of less than 1 ppm, a maximum silica content of less than 0.5 ppm, a maximum iron content of less than 1 ppm, a maximum a luminum content of less than 1 ppm, a maximum nitrate and nitrite content of 40 ppm, and a maximum acetate content of 7.5 ppm.

Because of the preferred high pH operating conditions of the process of the present invention, a certain amount of scaling will occur in the reverse osmosis membrane. Therefore, it is desirable to use an anti-scalant to reduce scaling and fouling caused by silica, calcium fluoride and magnesium. In the embodiment depicted in the drawing, the anti-scalant is pumped into the system via pump 41 and line 42. Any anti-scalant that is able to reduce the scaling of the membranes under the operating conditions of the system may be used. However, it is preferred that the anti-scalant does not contain phosphorous so that it does not promote biological growth in the waste water feed or in the tanks, piping, or reverse osmosis unit. By reducing membrane fouling, the anti-scalant minimizes membrane cleaning requirements.

The anti-scalant is used in a concentration of between about 5 and 200 ppm of the waste water. Preferably, about 10 ppm of anti-scalant are used to control scaling. Any of these concentrations of anti-scalant must not crystallize, precipitate, cause fouling, or cause other problems with the membrane. Still further, if fluoride and calcium levels in the waste water drop, using an overdose of the anti-scalant will not cause problems.

Most preferably, KochTREAT™ ASL720 anti-scalant, which is obtained from Koch Fluid Systems, is used. This anti-scalant is based on a hyperbranched macromolecule known as dendrimer. It maintains performance at extreme temperatures and pHs, is stable in the presence of multivalent ions such as iron and aluminum, does not contain phosphates which promote biological growth, and will not precipitate or foul the membrane at high concentration.

Example 1, infra, shows the compositions of feed and product streams during a pilot operation. Examples 2–4, infra, show the compositions of proposed feed steams and the compositions of resulting intermediate and product streams shown by computer models of the process of the present invention. These examples are not meant in any way to limit the scope of this invention.

EXAMPLE 1

The following table shows the composition of a waste water feed and the first and second permeates created by the process of the present invention during a pilot operation. The waste water fed was a MAE waste which was adjusted to pH 8.0 to 8.5 using NaOH. The pilot operation used 3 HR membrane modules in series. The MAE waste was passed through the membrane modules so as to be separated into a first permeate stream and a first reject stream. The first permeate stream was then fed through the same membrane module so as to be separated into a second permeate stream and a second reject stream.

|  | UNITS | Stream entering the first pass of the RO unit before pH adjustment | First Permeate | Second Permeate (Product) |
| --- | --- | --- | --- | --- |
| Total Organic Carbon (TOC) | ppb |  | 15,000 | 310 |
| pH |  | 3.1 | 7.3 | 6.6 |
| Silica, dissolved | ppb | 130,000 | 1,300 | 90 |
| total dissolved solids by conductivity | ppm | 28,000 | 760 | 19 |
| total suspended solids | ppm | 2.9 | 2.4 | 2.4 |
| turbidity | ntu | 0 | 0 | 0 |
| Total Alkalinity | mg as CaCO$_3$ | <1 | 32 | 6 |
| Anions by Ion Chromatography (IC) |  |  |  |  |
| acetate | ppb | 3,000,000 | 28,000 | 300 |
| fluoride | ppb | 1,500,000 | 22,000 | 260 |
| nitrate | ppb | 5,000,000 | 600,000 | 17,000 |
| Cations by Ion Chromatorgraph (IC) |  |  |  |  |
| sodium | ppb | * | 230,000 | 5,600 |
| Transition Metals by Inductively Coupled Plasma-Mass Spectrometry | ppb | * | * | * |
| aluminum | ppb | 6 | 15 | * |
| barium | ppb | * | 1 | * |
| boron | ppb | * | 13 | 9 |
| calcium | ppb | 280 | 500 | * |
| chromium | ppb | 19.0 | 1 | * |
| magnesium | ppb | 4 | 9 | 1 |
| manganese | ppb | 2 | * | * |
| nickel | ppb | 13 | 5 | * |
| potassium | ppb | * | 160 | * |
| sodium | ppb | 41,000 | 230,000 | 6,200 |
| zinc | ppb | 2 | 2.0 | * |

*element not > detection limits

EXAMPLE 2

The following table shows the compositions of a waste water feed and various resulting streams that were created by a computer model of the process of the present invention. The temperature of the feed was 25° C. The pH of the feed was adjusted to 8. A two pass reverse osmosis unit was used. The inlet pressure into the first reverse osmosis pass was 264.3 psig, and the inlet pressure into the second reverse osmosis pass was 249.7 psig. XR membranes were used in a 6:3 array in the first pass, and XR membranes were used in a 3:1 array in the second pass. The first pass obtained a 75% recovery, and the second pass obtained a 90% recovery.

temperature of the feed was 25° C. The pH of the feed was adjusted to 8. A two pass reverse osmosis unit was used. The inlet pressure into the first reverse osmosis pass was 245 psig, and the inlet pressure into the second reverse osmosis pass was 129.5 psig. XR membranes were used in the first

| Concentration | Feed (mg/L) | Feed after the pH is adjusted (mg/L) | Feed after the pH is adjusted plus recycled Second Reject (mg/L) | First Reject (mg/L) | First Permeate (mg/L) | Second Reject (mg/L) | Second Permeate (Product) (mg/L) |
|---|---|---|---|---|---|---|---|
| $Na^+$ | 1086.64 | 1124.75 | 1064.55 | 4159.53 | 32.89 | 322.04 | 0.76 |
| $K^+$ | 0.01 | 0.01 | 0.01 | 0.02 | 0.00 | 0.00 | 0.00 |
| $NH_4^+$ | 0.03 | 0.03 | 0.03 | 0.11 | 0.00 | 0.02 | 0.00 |
| $CO_3^-$ | 0.00 | 0.92 | 0.85 | 3.41 | 0.00 | 0.00 | 0.00 |
| $HCO_3^-$ | 1.15 | 100.37 | 93.85 | 371.45 | 1.36 | 13.45 | 0.24 |
| $Cl^-$ | 0.01 | 0.01 | 0.01 | 0.04 | 0.00 | 0.00 | 0.00 |
| $NO_3^-$ | 2140.03 | 2140.03 | 2030.49 | 7912.84 | 69.70 | 679.45 | 1.95 |
| $F^-$ | 642.09 | 642.09 | 595.51 | 2375.72 | 2.11 | 21.01 | 0.01 |
| $SiO_2$ | 55.65 | 55.65 | 52.04 | 205.89 | 0.75 | 7.45 | 0.01 |
| $CH_3CO_2^-$ | 1284.04 | 1284.04 | 1195.40 | 4750.76 | 10.28 | 102.18 | 0.07 |
| $CO_2$ | 73.93 | 1.63 | 1.63 | 1.63 | 1.59 | 1.59 | 1.43 |
| Total Ions | 5209.64 | 5347.90 | 5032.73 | 19779.78 | 117.09 | 1145.62 | 3.04 |
| Total Dissolved Solids (TDS) (180° C.) | 5209.06 | 5296.83 | 4984.98 | 19590.77 | 116.40 | 1138.77 | 2.91 |
| pH | 4.40 | 8.00 | 7.69 | 8.57 | 6.14 | 7.14 | 5.43 |
| Osmotic Pressure (psig) | 46.21 | 47.31 | 44.47 | 174.99 | 0.96 | 9.38 | 0.02 |
| Langlier Index | −9.60 | −6.00 | −6.31 | −5.43 | −7.86 | −6.86 | −8.57 |
| Stiff-Davis Index | −14.24 | −8.70 | −9.01 | −8.11 | — | — | — |

EXAMPLE 3

The following table shows the compositions of a waste water feed and various resulting streams were created by a computer model of the process of the present invention. The bank of the first pass, and HR membranes were used in the second bank of the first pass. HR membranes were used in the second pass. The first pass obtained a 75% recovery, and the second pass obtained a 90% recovery.

| Concentration | Feed (mg/L) | Feed after the pH is adjusted (mg/L) | Feed after the pH is adjusted plus recycled Second Reject (mg/L) | First Reject (mg/L) | First Permeate (mg/L) | Second Reject (mg/L) | Second Permeate (Product) (mg/L) |
|---|---|---|---|---|---|---|---|
| $Na^+$ | 1086.64 | 1124.75 | 1070.70 | 4155.65 | 42.39 | 404.17 | 2.19 |
| $K^+$ | 0.01 | 0.01 | 0.01 | 0.02 | 0.00 | 0.00 | 0.00 |
| $NH_4^+$ | 0.03 | 0.03 | 0.03 | 0.10 | 0.00 | 0.03 | 0.00 |
| $CO_3^-$ | 0.00 | 0.92 | 0.85 | 3.41 | 0.00 | 0.00 | 0.00 |
| $HCO_3^-$ | 1.15 | 100.37 | 94.12 | 371.34 | 1.75 | 17.06 | 0.26 |
| $Cl^-$ | 0.01 | 0.01 | 0.01 | 0.04 | 0.00 | 0.00 | 0.00 |
| $NO_3^-$ | 2140.03 | 2140.03 | 2043.47 | 7902.88 | 90.33 | 852.76 | 5.61 |
| $F^-$ | 642.09 | 642.09 | 595.98 | 2375.69 | 2.75 | 27.32 | 0.02 |
| $SiO_2$ | 55.65 | 55.65 | 52.19 | 205.84 | 0.98 | 9.55 | 0.02 |
| $CH_3CO_2^-$ | 1284.04 | 1284.04 | 1197.10 | 4750.45 | 12.65 | 124.88 | 0.18 |
| $CO_2$ | 73.93 | 1.63 | 1.63 | 1.63 | 1.60 | 1.60 | 1.45 |
| Total Ions | 5209.64 | 5347.90 | 5054.47 | 19765.44 | 150.84 | 1435.77 | 8.29 |
| Total Dissolved Solids (TDS) (180° C.) | 5209.06 | 5296.83 | 5006.58 | 19576.48 | 149.96 | 1427.09 | 8.16 |
| pH | 4.40 | 8.00 | 7.69 | 8.57 | 6.25 | 7.24 | 5.46 |
| Osmotic Pressure (psig) | 46.21 | 47.31 | 44.65 | 174.88 | 1.23 | 11.78 | 0.06 |
| Langlier Index | −9.60 | −6.00 | −6.31 | −5.43 | −7.75 | −6.76 | −8.54 |
| Stiff-Davis Index | −14.24 | −8.70 | −9.01 | −8.11 | — | — | — |

EXAMPLE 4

The following table shows the composition of a waste water feed and various resulting streams that were created by a computer model of the process of the present invention. The temperature of the feed was 25° C. The pH of the feed was adjusted to 9. A two pass reverse osmosis unit was used. The inlet pressure into the first reverse osmosis pass was 455.7 psig, and the inlet pressure into the second reverse osmosis pass was 179.0 psig. XR membranes were used in the first bank of the first pass, and HR membranes were used in the second bank of the first pass. HR membranes were used in the second pass. The first pass obtained a 75% recovery, and the second pass obtained a 90% recovery.

| Concentration | Feed (mg/L) | Feed after the pH is adjusted (mg/L) | Feed after the pH is adjusted plus recycled Second Reject (mg/L) | First Reject (mg/L) | First Permeate (mg/L) | Second Reject (mg/L) | Second Permeate (Product) (mg/L) |
|---|---|---|---|---|---|---|---|
| $Na^+$ | 2538.87 | 2539.10 | 2417.81 | 9385.41 | 95.28 | 921.45 | 3.49 |
| $HCO_3^-$ | 0.01 | 0.01 | 0.01 | 0.04 | 0.00 | 0.00 | 0.00 |
| $NO_3^-$ | 5000.00 | 5000.00 | 4773.55 | 18476.08 | 206.03 | 1979.31 | 9.00 |
| $F^-$ | 1500.00 | 1500.00 | 1392.20 | 5549.93 | 6.29 | 62.66 | 0.03 |
| $SiO_2$ | 130.00 | 130.00 | 121.91 | 480.89 | 2.26 | 22.19 | 0.04 |
| $CH_3CO_2^-$ | 3000.00 | 3000.00 | 2796.51 | 11099.22 | 28.94 | 286.76 | 0.29 |
| Total Ions | 12168.88 | 12169.11 | 11501.99 | 44991.57 | 338.80 | 3272.37 | 12.85 |
| Total Dissolved Solids (TDS) (180° C.) | 12168.88 | 12169.11 | 11501.99 | 44991.55 | 338.80 | 3272.37 | 12.85 |
| pH | 1.00 | 9.00 | 9.03 | 9.90 | 9.51 | 11.68 | 11.65 |
| Osmotic Pressure (psig) | 107.95 | 107.95 | 101.87 | 399.15 | 2.78 | 26.84 | 0.10 |
| Langlier Index | −13.00 | −5.00 | −4.97 | −4.10 | −4.49 | −2.32 | −2.35 |
| Stiff-Davis Index | −20.05 | −12.02 | −11.96 | −11.07 | — | — | — |

From the foregoing, it will be seen that this invention is one well adapted to attain all the ends and objects hereinabove set forth together with other advantages which are obvious and inherent to the process. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. A process for treating waste water comprising mixed acid etchant waste comprised of HF, nitric acid, and dissolved silica, said process comprising:
    adjusting the pH of said waste water to about 7 or above; and
    feeding said waste water through a reverse osmosis unit comprising at least one reverse osmosis membrane.

2. The process of claim 1, wherein said pH is adjusted to between about 8 and 10.

3. The process of claim 1, wherein said membrane is comprised of cellulose acetate or a thin film composite.

4. The process of claim 1, wherein said waste water further comprises solid particles, said process further comprising:
    filtering said waste water to remove said solid particles before feeding said waste water through said reverse osmosis membrane.

5. The process of claim 4, wherein the turbidity of said waste water is below about 3 nephelometric turbidity units (NTU) after said filtering step.

6. The process of claim 5, wherein said filtering step uses one or more filters selected from the group consisting of cartridge filters, line filters, bag filters, sand filters, multi-media filters, ultrafilters, and microfilters.

7. The process of claim 6, wherein said filter further comprising of activated carbon.

8. The process of claim 1, wherein said reverse osmosis unit comprises a first pass and a second pass, and wherein the step of feeding said waste water through said reverse osmosis unit comprises feeding said waste water through said first pass to separate said waste water into a first permeate stream and a first reject stream, feeding said first permeate stream through said second pass to separate said first permeate into a second permeate stream and a second reject stream, and combining said second reject with said waste water for re-treatment.

9. The process of claim 8, wherein said first pass comprises two membrane banks and said second pass comprises one membrane bank.

10. The process of claim 1, further comprising:
    adding an anti-scalant to said waste water before feeding said waste water through said reverse osmosis membrane.

11. The process of claim 1, wherein said mixed acid etchant waste further comprising, acetic acid.

12. The process of claim 1, wherein said waste water further comprises a second stream comprised of hydrofluoric acid.

13. The process of claim 12, wherein said second stream is further comprised of dissolved silica.

14. A system for treating waste water comprising mixed acid etchant waste, said system comprising:
    a tank containing said waste water and adapted for adjusting the pH of said waste water to about 7 or above;
    a filtration unit in fluid communication with said tank; and
    a reverse osmosis unit in fluid communication with said filtration unit and comprising at least one reverse osmosis membrane.

15. The system of claim 14, wherein said filtration unit is comprised of one or more filters selected from the group consisting of cartridge filters, line filters, bag filters, sand filters, multi-media filters, ultrafilters, and microfilters.

16. The system of claim 15, wherein said filter further comprising activated carbon.

17. The system of claim 14, wherein said membrane is comprised of cellulose acetate or a thin film composite.

18. The system of claim 14, wherein said reverse osmosis unit comprises a first pass and a second pass.

19. The system of claim 18, wherein said first pass comprises two membrane banks and said second pass comprises one membrane bank.

20. The system of claim 19, wherein the first bank of said first pass is comprised of extra-high reject membranes and wherein the second bank of said first pass and said bank of said second pass are comprised of high reject membranes.

21. The system of claim 18, wherein said first pass comprises two membrane banks and said second pass comprises two membrane banks.

22. A process for treating waste water comprising hydrofluoric acid, mixed acid etchant waste, dissolved silica, and solid particles, said process comprising:

adjusting the pH of said waste water to between about 8 and 10;

filtering said waste water to remove said solid particles;

adding an anti-scalant to said waste water; and feeding said waste water through a reverse osmosis comprising at least one reverse osmosis membrane.

* * * * *